W. B. C. HERSHEY.
VEHICLE BODY CONSTRUCTION.
APPLICATION FILED JUNE 15, 1908.
907,352.
Patented Dec. 22, 1908.
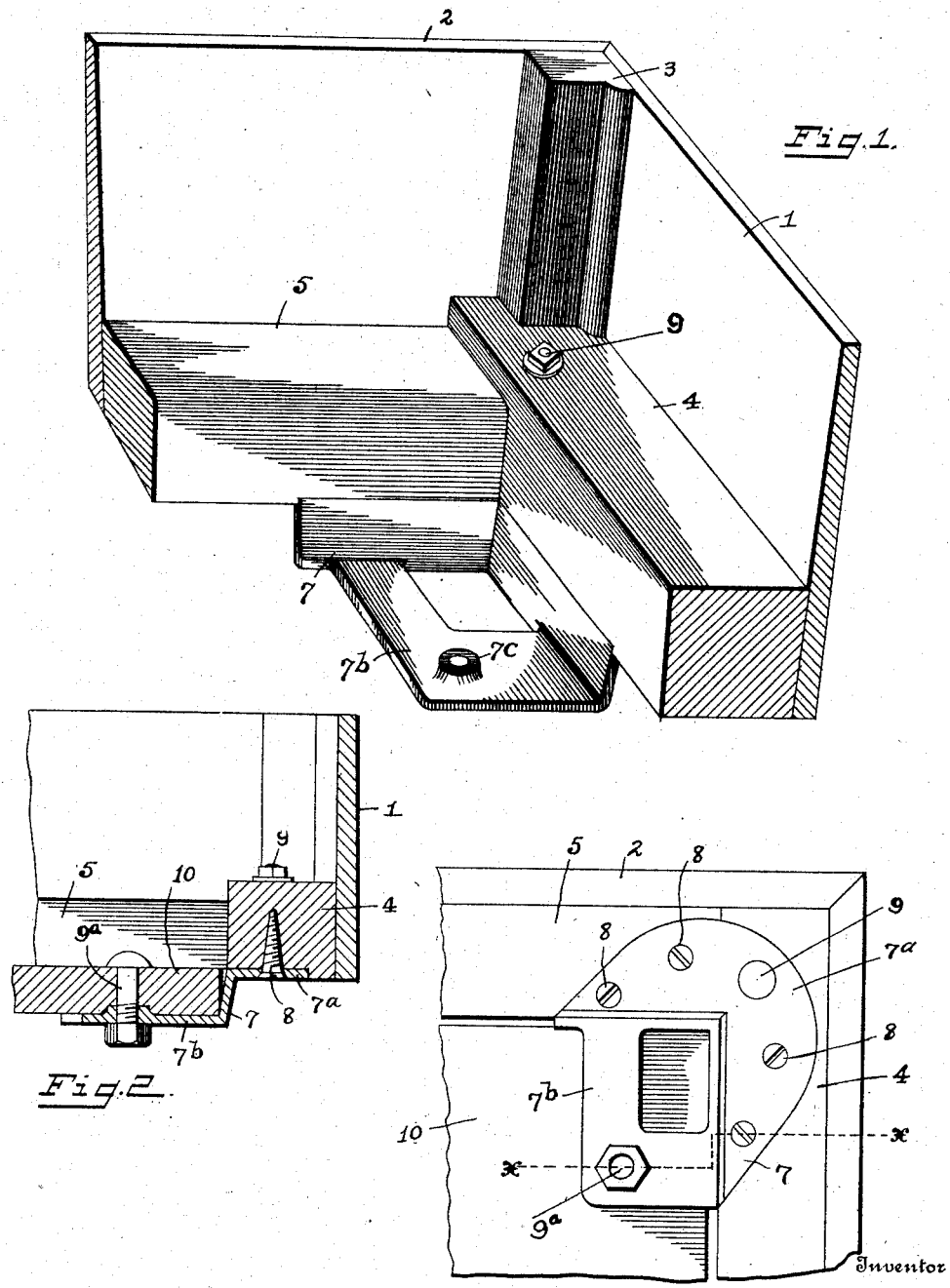
Witnesses
Carl Stoughton
A. L. Phelps
Inventor
William B. C. Hershey
By C. C. Shepherd
Attorney

UNITED STATES PATENT OFFICE.

WILLIAM B. C. HERSHEY, OF COLUMBUS, OHIO.

VEHICLE-BODY CONSTRUCTION.

No. 907,352.    Specification of Letters Patent.    Patented Dec. 22, 1908.

Application filed June 15, 1908. Serial No. 438,475.

*To all whom it may concern:*

Be it known that I, WILLIAM B. C. HERSHEY, a citizen of the United States, residing at Columbus, in the county of Franklin and State of Ohio, have invented certain new and useful Improvements in Vehicle-Body Constructions, of which the following is a specification.

My invention relates to the improvement of vehicle body construction and the objects of my invention are to provide a combined body frame connection and floor support of simple and inexpensive construction which will operate to greatly strengthen the construction of a vehicle body and prevent the separation of the parts thereof, and to produce other improvements the details of construction of which will be more fully pointed out hereinafter. These objects I accomplish in the manner illustrated in the accompanying drawing, in which:

Figure 1 is a view in perspective of one of the inner corners of a vehicle body showing my improvement in connection therewith and omitting the floor of the body, Fig. 2 is a sectional view on two planes as indicated by lines x—x of Fig. 3, and, Fig. 3 is an underside view of a vehicle body corner having my improvement.

Similar numerals refer to similar parts throughout the several views.

For the purpose of illustrating my device, I have shown the construction of but one corner of a vehicle body, the remaining corners thereof having the same construction.

1 represents a portion of one of the sides of the body and 2 a portion of one of the ends thereof. 3 represents a corner frame post which is secured to said side and end portions of the body, in the angle formed by the junction of said portions.

4 represents the inner longitudinal frame bar with which the lower portion of the side 1 of the vehicle body is connected and 5 represents the corresponding frame bar of the body back 2, these side and end frame bars being joined at their ends and extending at right angles with each other.

7 represents my improved bracket and connecting piece which is in the nature of a metallic plate which comprises a horizontal frame connecting portion 7$^a$ which as shown more clearly in Figs. 2 and 3 of the drawing, is secured by means of screws or other suitable fastening devices 8 to the adjoining end portions of the body frame bars 4 and 5. A further connection between said bars and plate portion 7$^a$ is effected by the employment of a bolt 9 which extends downward through the ends of the frame bars and through the outer portion of the member 7$^a$ of the plate 7.

The portion 7$^a$ of the casting 7 which thus unites the undersides of the adjoining frame members at the corner of a vehicle body, has formed therewith an inwardly projecting bracket member 7$^b$, the latter preferably being in the nature of a substantially rectangular plate extension which is depressed below the portion 7$^a$ and below the frame bars 4 and 5. This bracket projection 7$^b$ has formed therewith at its inner corner a short upwardly projecting boss 7$^c$ having a central vertical opening therethrough which is adapted to receive a bolt 9$^a$ which also passes through the corner portion of the vehicle body floor 10, the latter bearing upon the upper side of the bracket projection 7$^b$ and having an underside recess adapted to receive the boss 7$^c$.

As will readily be understood, the four bracket projections 7$^b$ of the four corner plates are thus made to provide a substantial support for the floor of the vehicle body, while the outwardly projecting member 7$^a$ serves the purpose of firmly uniting the side and end frame pieces of the body, thereby providing a substantially integral form of corner parts.

I am aware that various forms of corner irons have been employed for buggy bodies for the purpose of forming substantial joints for the sides and ends of the body, but it will be noted that in the construction described, the side and end pieces alone are joined by my device and that said device performs the additional office of supporting the floor of the body.

It is obvious that the device as shown and described, may be produced at a low cost of manufacture, and readily and easily affixed in connection with the body frame.

What I claim, is:

In a vehicle body, the combination with the floor, side and end members of the body and the side and end frame bars, of an integrally formed plate comprising a horizontally disposed frame uniting portion of such size as to underlie the adjacent portions of both the side and end frame bars, fastening devices which pass through said portion and which take into said side and end frame bars, an inwardly projecting horizontally disposed portion which lies a distance below the frame uniting portion equal to the thickness of the floor of the vehicle, an upwardly extending boss formed upon said inwardly projecting portion, and a fastening member which passes through said boss and through the floor of the vehicle, substantially as shown and described.

In testimony whereof I affix my signature in presence of two witnesses.

WILLIAM B. C. HERSHEY.

Witnesses:
C. C. SHEPHERD,
L. CARL STOUGHTON.